(12) United States Patent
Fisher

(10) Patent No.: US 9,915,333 B2
(45) Date of Patent: Mar. 13, 2018

(54) ELECTRONIC LIMITED SLIP DIFFERENTIAL WITH SEPARATION OF CLUTCH AND ACTUATOR

(71) Applicant: Eaton Corporation, Cleveland, OH (US)

(72) Inventor: Daniel P. Fisher, Coldwater, MI (US)

(73) Assignee: Eaton Corporation, Cleveland, OH (US)

( * ) Notice: Subject to any disclaimer, the term of this patent is extended or adjusted under 35 U.S.C. 154(b) by 86 days.

(21) Appl. No.: 15/016,941

(22) Filed: Feb. 5, 2016

(65) Prior Publication Data

US 2016/0153536 A1     Jun. 2, 2016

Related U.S. Application Data

(63) Continuation of application No. PCT/US2014/050026, filed on Aug. 7, 2014.

(60) Provisional application No. 61/863,142, filed on Aug. 7, 2013, provisional application No. 61/864,119, filed on Aug. 9, 2013, provisional application No.
(Continued)

(51) Int. Cl.
| | |
|---|---|
| *B60K 17/00* | (2006.01) |
| *B60K 23/00* | (2006.01) |
| *F16H 48/22* | (2006.01) |
| *F16H 48/32* | (2012.01) |

(Continued)

(52) U.S. Cl.
CPC ............. *F16H 48/22* (2013.01); *F16H 48/08* (2013.01); *F16H 48/32* (2013.01); *F16H 48/34* (2013.01)

(58) Field of Classification Search
CPC ........................ B60K 17/3462; B60K 23/0808
See application file for complete search history.

(56) References Cited

U.S. PATENT DOCUMENTS

| | | | | |
|---|---|---|---|---|
| 4,644,823 | A | * | 2/1987 | Mueller ............. B60K 17/3462 180/248 |
| 4,805,486 | A | * | 2/1989 | Hagiwara ............... F16H 48/08 475/150 |

(Continued)

FOREIGN PATENT DOCUMENTS

| | | |
|---|---|---|
| DE | 102009001561 A1 | 9/2010 |
| EP | 0090944 A2 | 10/1983 |

(Continued)

OTHER PUBLICATIONS

International Search Report and Written Opinion for International Application No. PCT/US2014/050026 dated Jan. 13, 2015, 17 pages.

*Primary Examiner* — Tisha Lewis
(74) *Attorney, Agent, or Firm* — RMCK Law Group PLC

(57) ABSTRACT

A differential gear mechanism incudes a differential casing. A first and a second side gear can be rotatably mounted within the differential casing. A pair of pinion gears can be mounted between the first and second side gears. Both of the pinion gears can be rotatably mounted on a cross shaft that is fixed for rotation with the differential casing. A clutch pack can include a plurality of annular plates that are interleaved between a plurality of annular friction disks. The clutch pack can be arranged on a first side of the cross shaft. An actuator assembly can comprise a piston received in a piston housing. The actuator assembly can be configured to actuate the clutch pack. The actuator assembly can be arranged on a second side of the cross shaft, opposite the first side.

23 Claims, 8 Drawing Sheets

Related U.S. Application Data

61/875,203, filed on Sep. 9, 2013, provisional application No. 62/030,683, filed on Jul. 30, 2014.

(51) Int. Cl.
*F16H 48/08* (2006.01)
*F16H 48/34* (2012.01)

(56) References Cited

U.S. PATENT DOCUMENTS

| | | | | |
|---|---|---|---|---|
| 4,934,213 | A | * | 6/1990 | Niizawa .................. F16H 48/08 475/239 |
| 5,924,948 | A | * | 7/1999 | Kwoka .................... F16H 48/08 475/88 |
| 8,840,515 | B2 | * | 9/2014 | Van Der Hardt Aberson ........... B60K 17/20 475/231 |

FOREIGN PATENT DOCUMENTS

| | | |
|---|---|---|
| EP | 0198143 A1 | 10/1986 |
| WO | 2006075246 A1 | 7/2006 |

* cited by examiner

ELECTRONIC LIMITED SLIP DIFFERENTIAL WITH SEPARATION OF CLUTCH AND ACTUATOR

CROSS-REFERENCE TO RELATED APPLICATIONS

This application is a continuation of International Patent Application No. PCT/US2014/050026 filed on Aug. 7, 2014, which claims the benefit of U.S. Patent Application No. 61/863,142 filed on Aug. 7, 2013, U.S. Patent Application No. 61/864,119 filed on Aug. 9, 2013, U.S. Patent Application No. 61/875,203 filed on Sep. 9, 2013 and U.S. Patent Application No. 62/030,683 filed on Jul. 30, 2014. The disclosures of the above applications are incorporated herein by reference.

FIELD

The present disclosure relates generally to differential gear assemblies and more particularly to a differential gear case arrangement having a clutch and a piston actuator configured on opposite ends of the differential gear case.

BACKGROUND

A differential gear mechanism can be provided in an axle assembly and used to transfer torque from a driveshaft to a pair of output shafts. The driveshaft can drive the differential through the use of a bevel gear that meshes with a ring gear mounted to a housing of the differential. In automotive applications, a differential allows the tires mounted at either end of the axle assembly to rotate at different speeds. This is important when the vehicle is turning because the outer tire travels over an arc of greater distance than the inner tire. Thus, the outer tire must rotate at a faster speed than the inner tire to compensate for the greater distance of travel. The differential includes a differential case and a gear arrangement that allows torque to be transferred from the driveshaft to the output shafts while concurrently allowing the output shafts to rotate at different speeds as needed. The gear arrangement can generally include a pair of side gears that are mounted for rotation with the respective output shafts. A series of cross pins or pinion gear shafts are fixedly mounted to the differential case for rotation therewith. A corresponding plurality of pinion gears are mounted for rotation with the pinion gear shafts and are in meshing relationship with both of the side gears.

Some differential gear mechanisms include traction modifying differentials. Typically, a clutch pack can be disposed between one of the side gears and an adjacent surface of the differential case. The clutch pack or locking mechanism is operable to limit relative rotation between the gear case and the one side gear. In such differentials, engaging the clutch pack or locking mechanism (retarding differentiation) is achieved by one of several different approaches. Some configurations include a piston that actuates to cause the clutch pack to move between open, locked and partially locked conditions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A differential gear mechanism constructed in accordance to one example of the present disclosure can include a differential casing defining first and second output shaft openings that are co-axially aligned along an axis of rotation of the differential casing. A first and a second side gear can be rotatably mounted within the differential casing. The first and second side gears can be co-axially aligned along the axis of rotation of the differential casing. The first side gear can define a first shaft opening configured to provide a first torque transmitting connection with a first output shaft received within the first output shaft opening. The second side gear can define a second output shaft opening configured to provide a second torque transmitting connection with a second output shaft received within the second output shaft opening. A pair of pinion gears can be mounted between the first and second side gears. Both of the pinion gears can be rotatably mounted on a cross shaft that is fixed for rotation with the differential casing. A clutch pack can include a plurality of annular plates that are interleaved between a plurality of annular friction disks. The clutch pack can be arranged on a first side of the cross shaft. An actuator assembly can comprise a piston received in a piston housing. The actuator assembly can be configured to actuate the clutch pack. The actuator assembly can be arranged on a second side of the cross shaft, opposite the first side.

According to additional features, the differential gear mechanism can further comprise a plurality of transfer rods that couple the clutch pack and the actuator assembly. The clutch pack can further comprise a first transfer plate. The actuator assembly can further comprise a second transfer plate. The plurality of transfer rods can be coupled between the first and second transfer plates.

According to other features, the actuator assembly can further comprise a retainer and a first needle roller disposed on one side of the piston housing and a second needle roller disposed on an opposite side of the piston housing. The piston can further comprise at least one o-ring mounted thereon. The at least one o-ring can be configured to slidably traverse along the piston housing. The actuator assembly can further comprise a hydraulic fitting extending from an outer diameter of the piston housing. The hydraulic fitting can be configured to communicate hydraulic fluid from a hydraulic fluid source to the actuator assembly.

In other features, the pair of pinion gears can be intermeshed with the first and second side gears to form a torque transfer arrangement configured for transferring torque between the pinion gears and the first and second side gears to rotate the first and second side gears about the axis of rotation. The torque transfer arrangement can also be configured to allow the first and second side gears to rotate at different rotational speeds with respect to one another about the axis of rotation. The clutch pack can be concentric with the first side gear. The actuator assembly can be concentric with the second side gear.

According to other features, the clutch pack and the actuator assembly can be configured on opposite ends of the differential casing. The piston can include a piston body defined around a central piston axis. The piston body can include a central piston wall, an outer diameter piston wall and an inner diameter piston wall. The piston housing can include a central annular housing wall, an outer annular housing wall and an inner annular housing wall that collectively define an annular pocket that receives the piston.

In other features, the differential gear assembly can include a lug formed on one of the piston and the piston housing. A groove can be defined by a groove wall on the other of the piston and the piston housing. The lug can be received by the groove. Engagement of the lug and the groove wall inhibits rotation of the piston around the central piston axis. The lug can be formed on the piston. The groove can be formed on the piston housing. In one configuration, the lug can be formed on the inner diameter piston wall. The groove can be formed on the inner annular housing wall. The lug can comprise a pair of lugs configured on the inner diameter piston wall. The groove can comprise a pair of grooves formed on the inner annular housing wall. The pair of lugs can be arranged in a diametrically opposed relationship on the inner diameter piston wall. The pair of grooves can be arranged in a diametrically opposed relationship on the inner annular housing wall. The outer diameter piston wall can define a first annular groove and the inner diameter piston wall can define a second annular groove. A first o-ring can be received by the first annular groove. A second o-ring can be received by the second annular groove. The first o-ring can be configured to slidably traverse along the outer annular housing wall. The second o-ring configured to slidably traverse along the inner annular housing wall.

A differential gear assembly constructed in accordance to additional features of the present disclosure can include a differential casing that defines first and second output shaft openings. The first and second output shaft openings can be co-axially aligned along an axis of rotation of the differential casing. A first and a second side gear can be rotatably mounted within the differential casing. A piston can have a piston body defined around a central piston axis. The piston body can include a central piston wall, an outer diameter piston wall and an inner diameter piston wall. The piston body can be configured to exert an axial force on a clutch pack.

A piston housing can have a central annular housing wall, an outer annular housing wall and an inner annular housing wall that collectively define an annular pocket that receives the piston. A lug can be formed on one of the piston and the piston housing. A groove can be defined by a groove wall on the other of the piston and the piston housing. The lug can be received by the groove. Engagement of the lug and the groove wall can inhibit rotation of the piston around the central piston axis. The differential gear assembly can further comprise a clutch pack. The clutch pack can include a plurality of annular plates that are interleaved between a plurality of annular friction disks. The clutch pack can be arranged on an opposite side of the differential casing as the piston.

A differential gear assembly constructed in accordance to additional features can include a differential casing defining first and second output shaft openings that are co-axially aligned along an axis of rotation of the differential casing. A first and a second side gear can be rotatably mounted within the differential casing. A pair of pinion gears can be mounted between the first and second side gears. Both of the pinion gears cab be rotatably mounted on a cross shaft that is fixed for rotation with the differential casing. A clutch pack can include a first transfer plate and a plurality of annular plates interleaved between a plurality of annular friction disks. The clutch pack can be arranged on a first side of the cross shaft. An actuator assembly can comprise a second transfer plate and a piston received in a piston housing. The actuator assembly can be configured to actuate the clutch pack. The actuator assembly can be arranged on a second side of the cross shaft, opposite the first side. A plurality of transfer rods can be coupled between the first and second transfer plates.

According to other features, the differential gear assembly can further include a lug formed on one of the piston and the piston housing. A groove can be defined by a groove wall on the other of the piston and the piston housing. The lug can be received by the groove. Engagement of the lug and the groove wall can inhibit rotation of the piston around the central piston axis.

BRIEF DESCRIPTION OF THE DRAWINGS

The present disclosure will become more fully understood from the detailed description and the accompanying drawings, wherein.

DETAILED DESCRIPTION

Figure 1:
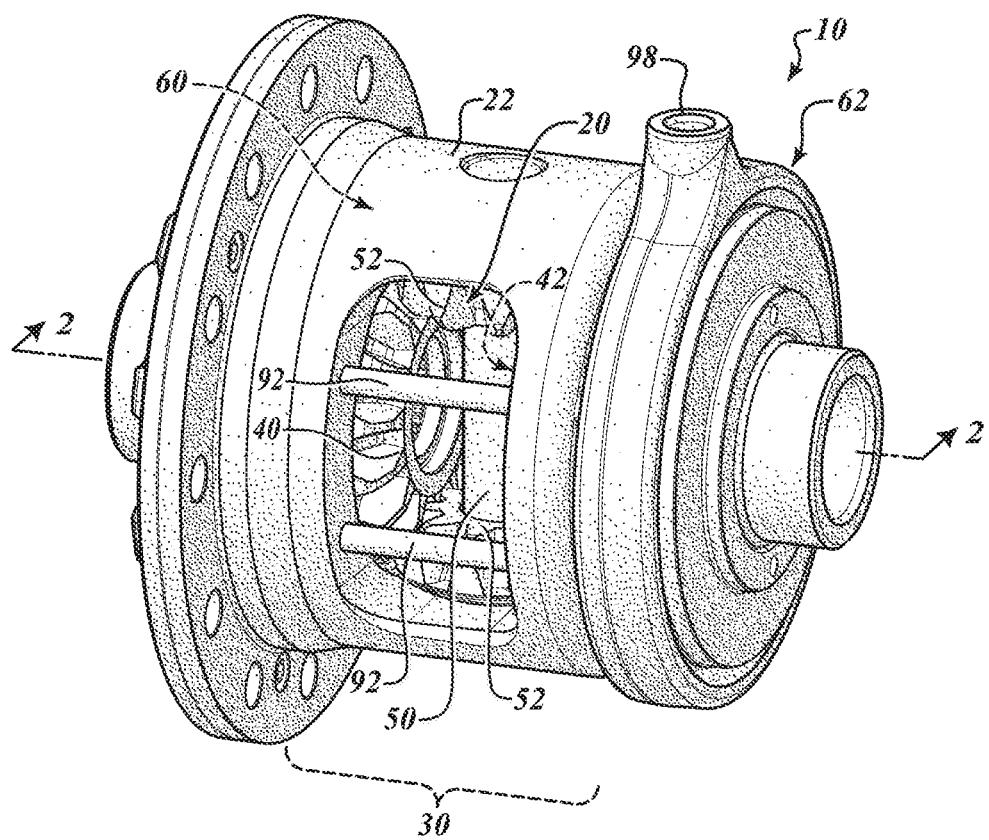
FIG. 1 is a front perspective view of a differential gear mechanism constructed in accordance to one example of the present disclosure.

With initial reference to FIG. 1, an electronic limited slip differential assembly constructed in accordance to the present disclosure is shown and generally identified at reference 10. The electronic limited slip differential assembly 10 can generally include a differential gear assembly or mechanism 20 arranged in a differential case 22 and a clutch assembly 30. The limited slip differential assembly 10 can be received in a housing (not shown) and operates to drive a pair of axle shafts (not shown) that are connected to drive wheels (not shown). In general, the limited slip differential assembly 10 functions as a traditional open differential during normal operating conditions until an event occurs where a bias torque is required. When a loss in traction is detected or anticipated, the clutch assembly 30 can be selectively actuated in order to generate the optimum bias ratio for the situation.

Figure 2:
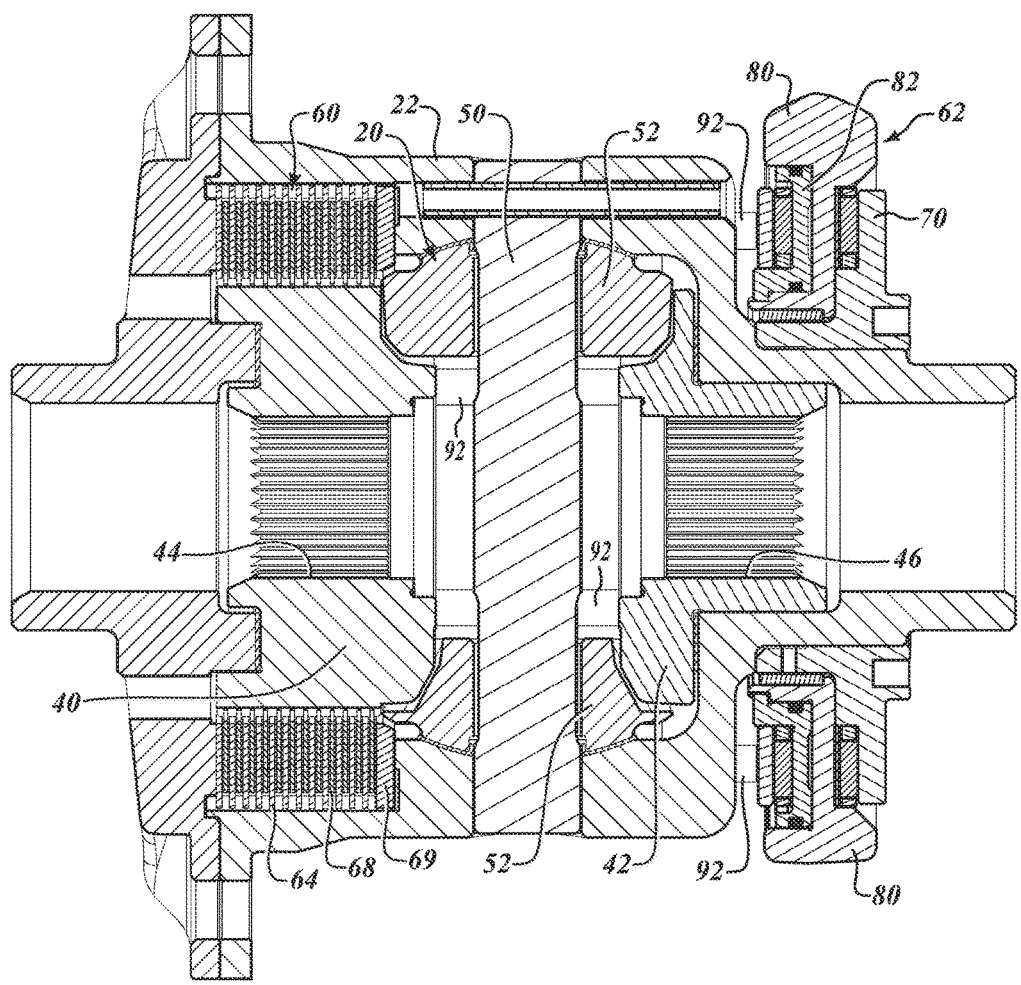
FIG. 2 is a cross-sectional view of the differential gear mechanism of FIG. 1 taken along lines 2-2.
Figure 3:
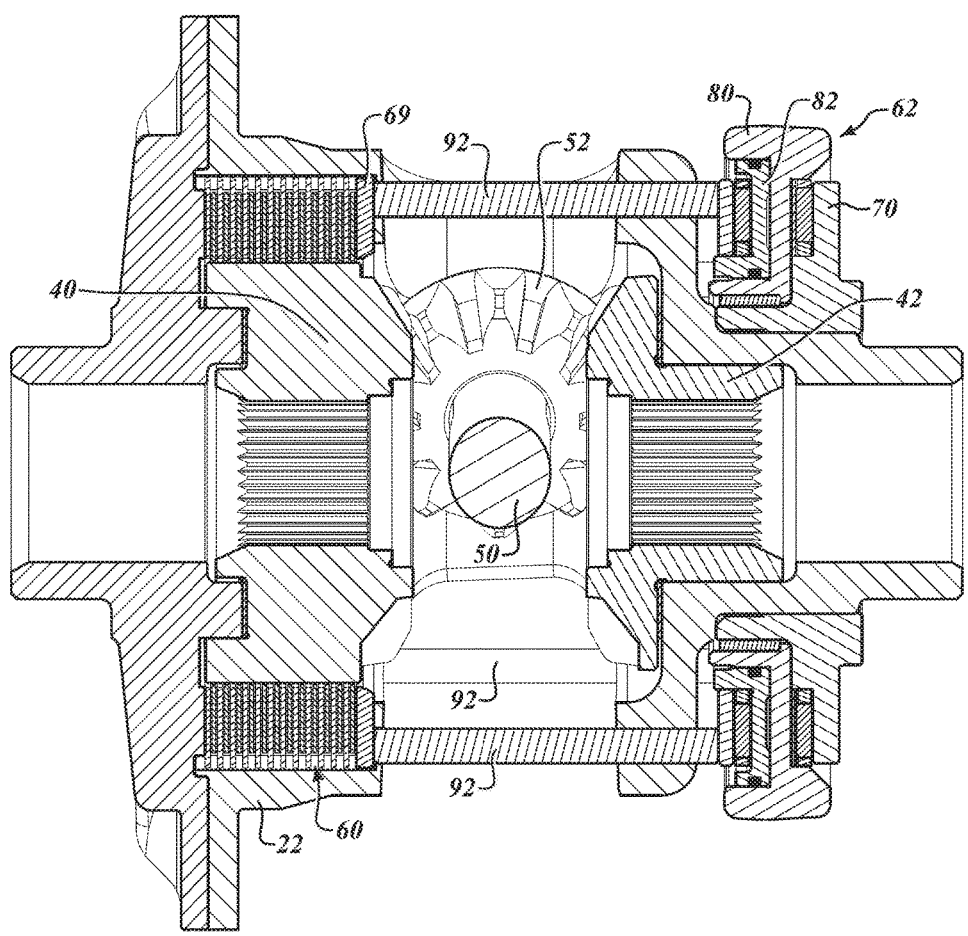
FIG. 3 is a cross-sectional view of the differential gear mechanism of FIG. 1 taken along lines 3-3.

With additional reference to FIGS. 2 and 3, the differential gear assembly 20 includes a pair of side gears 40 and 42 that are mounted for rotation with the axle shafts (and first and second drive wheels). The side gears 40 and 42 define first and second axle shaft openings 44 and 46 (FIG. 3). A cross pin or pinion gear shaft 50 can be fixedly mounted to the differential case 22 for rotation therewith. A corresponding pair of pinion gears 52 are mounted for rotation with the pinion gear shaft 50 and are in meshing relationship with both of the side gears 40 and 42. In an open configuration, described more fully below, the differential gear assembly 20 acts to allow the axle shafts to rotate at different speeds.

The clutch assembly 30 couples an input of the electronic limited slip differential 10 with the differential gear assembly 20. In some examples, the input can comprise a ring gear fixedly arranged around the differential case 22 that is driven by a pinion gear. The clutch assembly 30 can generally comprise a clutch pack 60 and a clutch actuator assembly 62.

The clutch pack 60 includes a plurality of annular plates 64 interleaved between a plurality of annular friction disks 68. The plurality of annular plates 64 can be coupled for rotation with one of the differential case 22 and the differential gear assembly 20. The plurality of annular friction disks 68 can be coupled for rotation with the other one of the differential case 22 and the differential gear assembly 20. In the illustrated embodiment, the plurality of annular plates 64 are coupled for rotation to the differential case 22 (e.g., splined to an inner diameter of the differential case 22) and the plurality of annular friction disks 68 are coupled for rotation with the differential gear assembly 20 (e.g., splined to an outer diameter of the side gear 40). It will be appreciated that the annular friction disks 68 may be supported for rotation by either of the side gears 40 or 42, or both. A first transfer plate 69 can be arranged as part of the clutch pack 60.

The plurality of annular plates 64 and annular friction disks 68 are interleaved between one another and act to rotate past one another in substantially non-contacting relationship when the clutch assembly 30 is in its open position. However, it will be appreciated by those skilled in the art that the term "non-contacting" as used herein is relative and is not meant to necessarily indicate that the annular plates 64 and annular friction disks 68 have absolutely no contact when the clutch assembly 30 is in the open condition. The annular plates 64 and annular friction disks 68 are axially movable into frictional engagement relative to one another, thereby reducing relative rotation between the annular plates 64 and annular friction disks 68 when the clutch assembly 30 is in the closed or partially closed configurations. In this manner, when the clutch assembly 30 is in its closed position, the side gears 40 and 42, as well as the axle shafts and the drive wheels rotate together.

The clutch assembly 30 can operate in an open configuration to allow the side gears 40 and 42 to rotate independently from each other, e.g., at different speeds. The clutch assembly 30 can also operate in a closed or partially closed configuration where the side gears 40 and 42 rotate together or partially together (that is, not independently), e.g., at substantially the same speed. The clutch assembly 30 can, for example, be a hydraulic clutch assembly 30 that utilizes pressurized hydraulic fluid that can act on the actuator assembly 62 to selectively actuate the clutch pack 60 between the open, closed and partially closed configurations.

Figure 4:
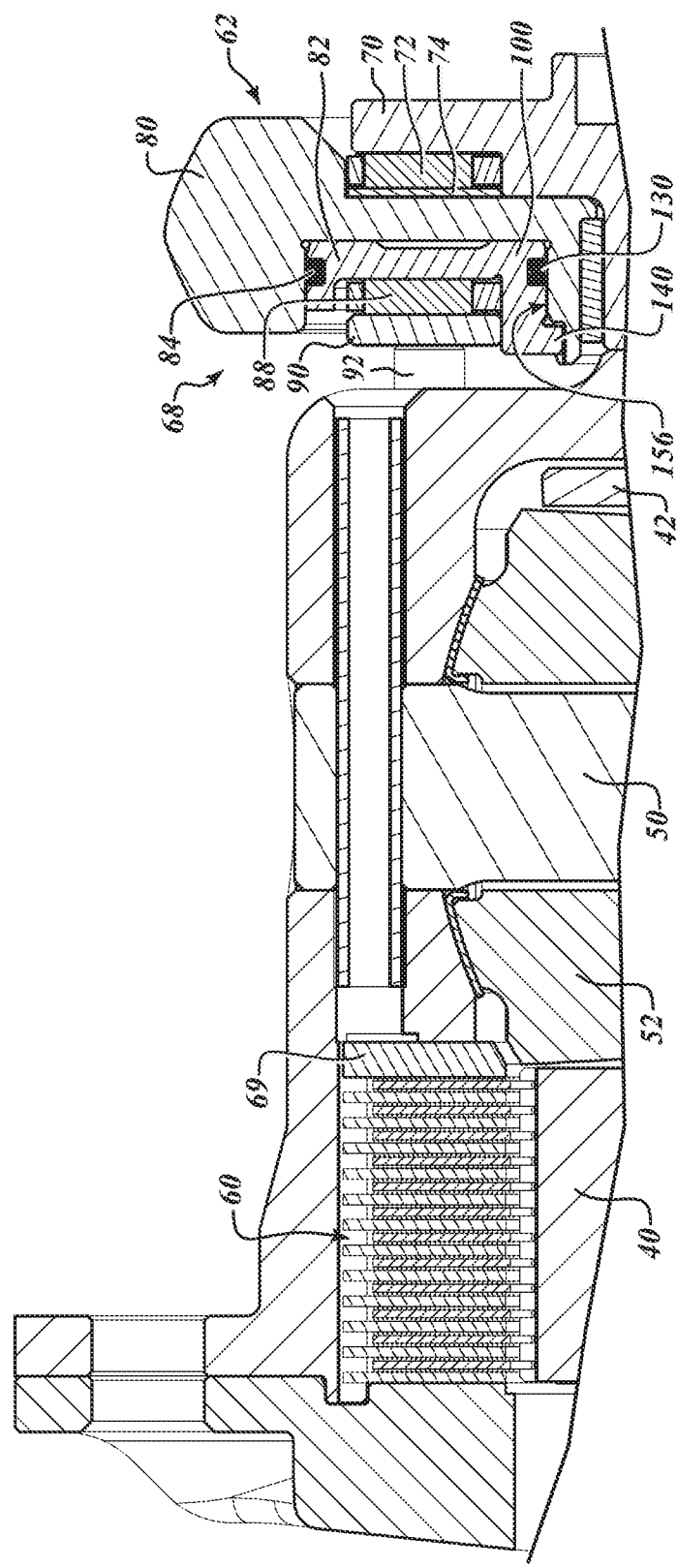
FIG. 4 is a detail view of the actuator assembly of FIG. 1.
Figure 5:
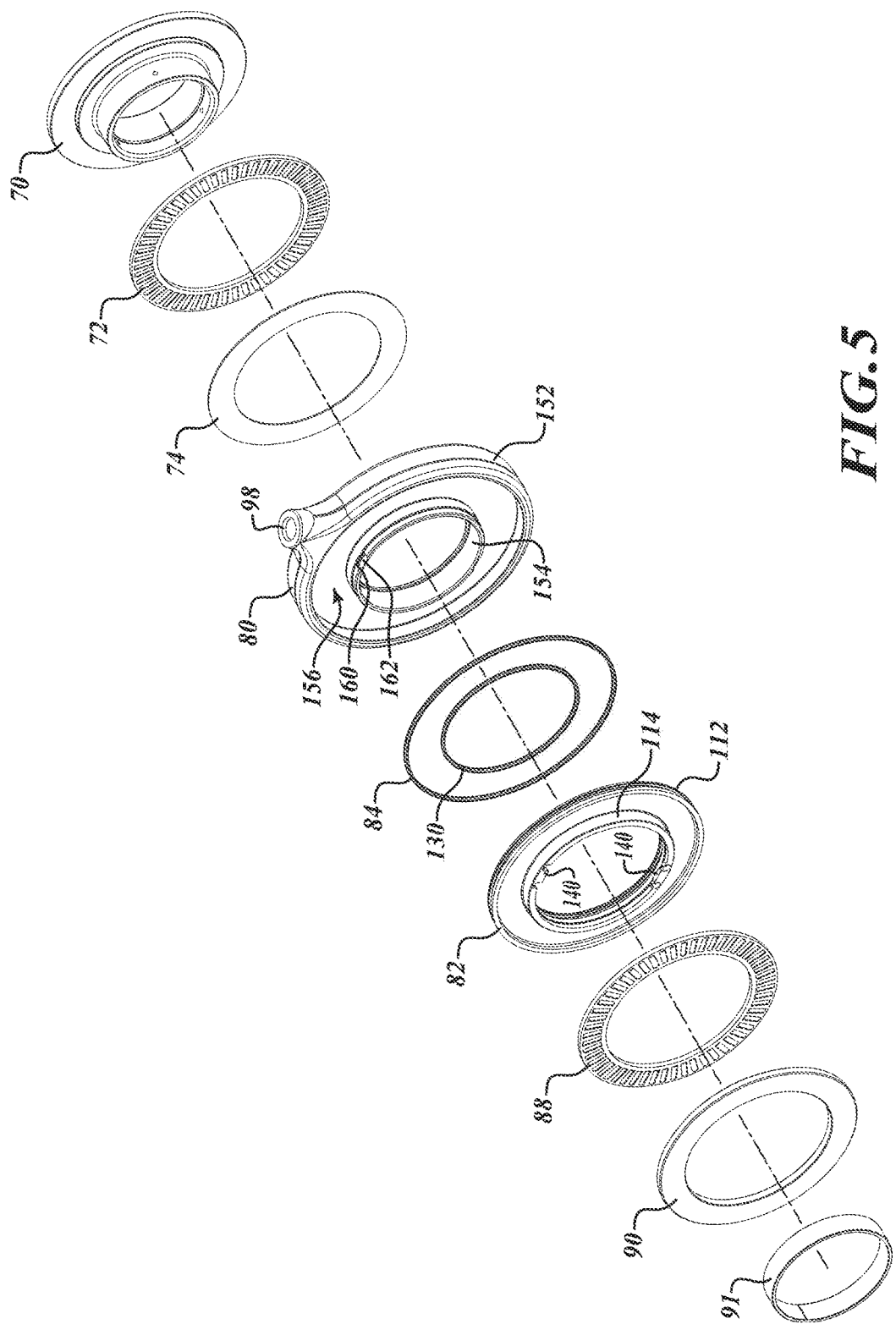
FIG. 5 is an exploded view of the actuator assembly of FIG. 4.

With particular reference now to FIGS. 2-4, the actuator assembly 62 will by further described. The actuator assembly 62 is arranged on an opposite end of the differential case 22 as the clutch pack 60. In one example, the clutch pack 60 can be generally concentric with the first side gear 40 and the actuator assembly can be generally concentric with the second side gear. As a result of positioning the actuator assembly 62 on an opposite end of the differential case 22 as the clutch pack 60, a number of advantages are realized. For example, the resulting package size of the electronic limited slip differential 10 is reduced. The cross-shaft 50 is centered between bearing races. Stock axle shafts having standard lengths can be used. The clutch pack 60 can be constructed larger to provide greater torque capacity. The electronic limited slip differential 10 can be replaced with an "open" differential on the same assembly line. The actuator assembly 62 can generally include a piston assembly 68 having a retainer 70, a first needle roller 72, a bearing race 74, a piston housing 80, a piston 82, a pair of o-rings 84, a second needle roller 88 and a second transfer plate 90. The second transfer plate 90 can act as a bearing race for the second needle roller 88. The piston housing 80 can be mounted in a ring 91 that seats on the retainer 70.

A plurality of transfer rods 92 are disposed between the second transfer plate 90 of the actuator assembly 62 and the first transfer plate 69 of the clutch pack 60. In the example shown, eight transfer rods 92 are disposed between the second transfer plate 90 and the first transfer plate 69. The transfer rods 92 can be spaced equally around the differential casing 22. Other quantities of transfer rods are contemplated. Furthermore, other structures may be used to transfer force between the first and second transfer plates 70 and 90.

With further reference now to FIGS. 5-8, additional features of the piston assembly 68 will be described. During operation, movement of the piston 82 leftward (as viewed in FIGS. 2-4) causes the transfer rods 92 to push the first transfer plate 69 leftward causing the clutch pack 60 to close. Similarly, when pressure is released from the piston 82, the transfer rods 92 move in an axial direction rightward (as viewed in FIGS. 2-4) causing the clutch pack 60 to open. Hydraulic fluid can be communicated from a hydraulic fluid source (not shown) to the actuator assembly 62 through a port 98.

The piston 82 can include a piston body 100 defined around a central piston axis 102. The piston body 100 can include a central piston wall 110, an outer diameter piston wall 112 and an inner diameter piston wall 114. The outer diameter piston wall 112 can define a first annular groove 120. The inner diameter piston wall 114 can define a second annular groove 122. The first o-ring 84 can be received by the first annular groove 120. A second o-ring 130 can be received by the second annular groove 122. The first and second o-rings 84 and 130 can be configured to slidably traverse along the piston housing 80.

The piston 82 can define a pair of lugs 140 extending from the inner diameter piston wall 114. The lugs 140 are arranged in a diametrically opposed relationship on the piston body 100. As will become appreciate from the following discussion, while the lugs 140 are shown as a pair of lugs around the inner diameter piston wall 114, other quantities of lugs 140 and other locations of the lugs 140 are contemplated.

The piston housing 80 will now be further described. The piston housing 80 can generally include a central annular housing wall 150, an outer annular housing wall 152 and an inner annular housing wall 154. The central annular housing wall 150, the outer annular housing wall 152 and the inner annular housing wall 154 can collectively define an annular pocket 156 that receives the piston 82. The piston 82 is configured to ride within the annular pocket 156 upon introduction of hydraulic fluid between the piston 82 and the piston housing 80. The o-rings 84 and 130 sealingly engage the piston housing 80. During operation, the piston housing 80 does not rotate.

The piston housing 80 can include a pair of groove walls 160 that define a pair of corresponding grooves 162. In the example shown, the grooves 162 are formed on the inner annular housing wall 154 in a diametrically opposed relationship. The grooves 162 are provided in a reduced thickness portion formed on the inner annular housing wall 154.

Figure 6:
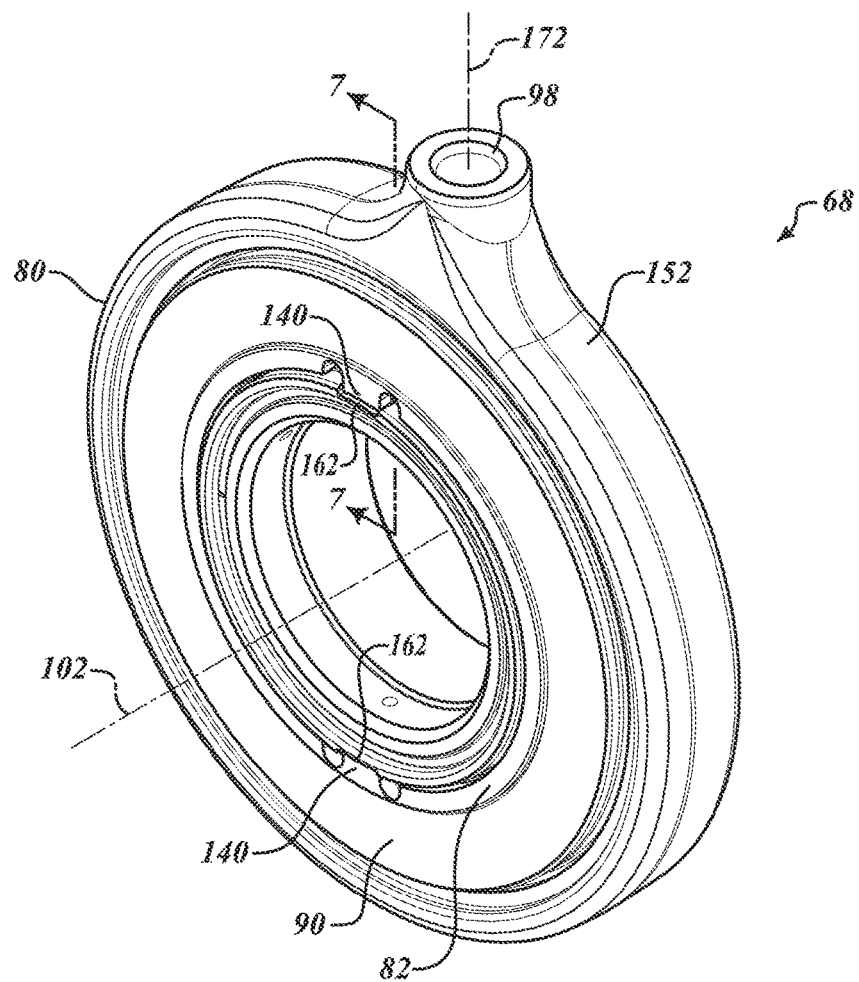
FIG. 6 is a perspective view of a piston assembly of the differential gear mechanism of FIG. 1.

As will become appreciated from the following discussion, while the grooves 162 are shown as a pair of grooves around the inner annular housing wall 154, other quantities of grooves and other locations of grooves are contemplated. Moreover, while the lugs 140 are shown as part of the piston 82 and the grooves are shown as part of the piston housing 80, the features may be reversed. Alternatively, the piston 82 may incorporate one or more lugs in addition to one or more grooves while the piston housing 80 may incorporate one or more lugs in addition to one or more grooves. Regardless, the relationship of the lugs 140 and the grooves 162 inhibits rotation of the piston 82 around the central piston axis 102. In this regard, the lugs 140 can engage the groove walls 160 restricting rotation of the piston 82 around the central piston axis 102 (FIG. 6).

As identified above, the piston assembly 62 can further include a hydraulic port 98 configured on the piston housing 80. The hydraulic port 98 can be configured to communicate hydraulic fluid from the piston assembly 68. In the example shown, the hydraulic port 98 is formed on the outer annular housing wall 152. The hydraulic port 98 can extend along a longitudinal port axis 172. The longitudinal port axis 172 can be transverse to the central piston axis 102 (FIG. 6). The hydraulic port 98 can communicate hydraulic fluid from a hydraulic fluid source (not shown) to the actuator assembly 62.

Figure 7:
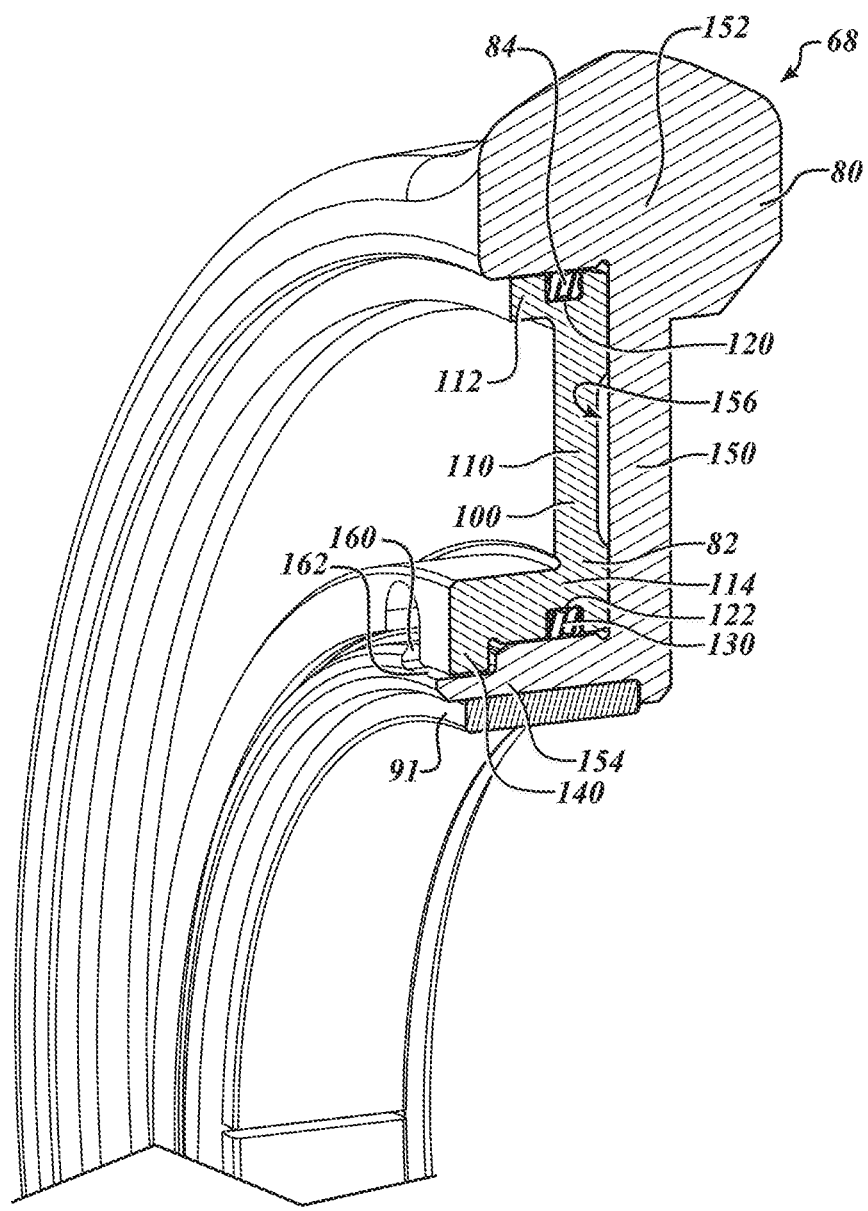
FIG. 7 is a cross-sectional view of the piston assembly of FIG. 6 taken along lines 7-7 and shown with the piston in a relaxed state.
Figure 8:
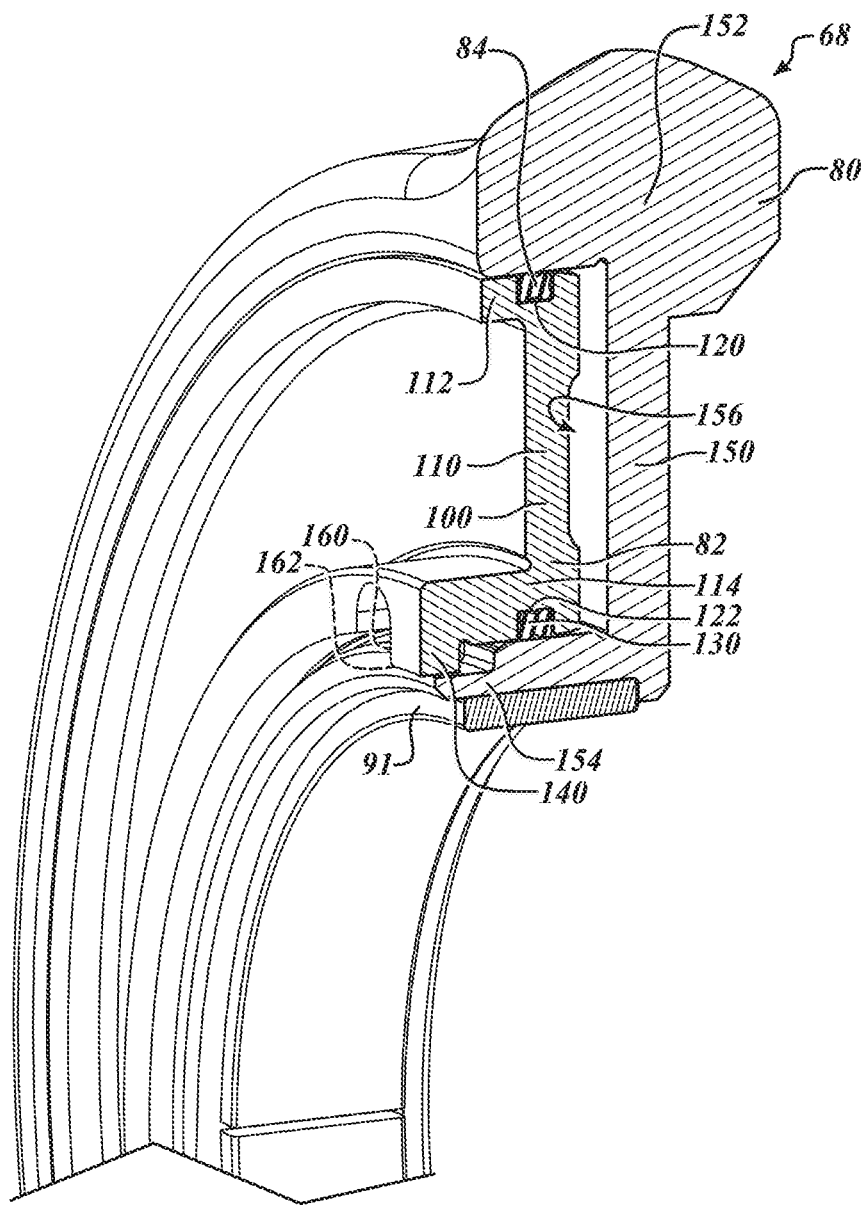
FIG. 8 is a cross-sectional view of the piston assembly of FIG. 7 and shown with the piston in a fully exerted state.

During operation, the piston 82 can move from a relaxed state (FIG. 7) to an exerted state (FIG. 8). As shown in FIGS. 7 and 8, in both states, the lugs 140 on the piston 82 remain engaged with the grooves 162 on the piston housing 80 thereby inhibiting rotation of the piston 82 around the central axis 102 (FIG. 6). In some implementations, axial forces can become large enough to rotate the piston 82 within the piston housing pocket 156. Such a condition is undesirable as it may cause galling, premature wear and/or tearing of the sealing features of the piston assembly 62. The lug and groove features provided by the piston assembly 62 of the present teachings eliminates such a condition. In other benefits, the piston assembly 68 provides anti-rotation features without increased components. In this regard, additional components such as, but not limited to, dowel pins, clips and fasteners are not needed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A differential gear assembly comprising:
   a differential casing defining first and second output shaft openings that are co-axially aligned along an axis of rotation of the differential casing;
   a first and a second side gear rotatably mounted within the differential casing, the first and second side gears being co-axially aligned along the axis of rotation of the differential casing, the first side gear defining a first shaft opening configured to provide a first torque transmitting connection with a first output shaft received within the first output shaft opening, the second side gear defining a second output shaft opening configured to provide a second torque transmitting connection with a second output shaft received within the second output shaft opening;
   a pair of pinion gears mounted between the first and second side gears, both of the pinion gears being rotatably mounted on a cross shaft that is fixed for rotation with the differential casing;
   a clutch pack including a plurality of annular plates interleaved between a plurality of annular friction disks, the clutch pack arranged on a first side of the cross shaft;
   an actuator assembly comprising a piston received in a piston housing, the actuator assembly configured to actuate the clutch pack, the actuator assembly arranged on a second side of the cross shaft, opposite the first side;
   a lug formed on one of the piston and piston housing: and
   a groove defined by a groove wall on the other of the piston and the piston housing, wherein the lug is received by the groove and engagement of the lug and the groove wall inhibits rotation of the piston around the central piston axis.

2. The differential gear assembly of claim 1, further comprising a plurality of transfer rods that couple the clutch pack and the actuator assembly.

3. The differential gear assembly of claim 2 wherein the clutch pack further comprises a first transfer plate and the actuator assembly further comprises a second transfer plate, wherein the plurality of transfer rods are coupled between the first and second transfer plates.

4. The differential gear assembly of claim 1 wherein the actuator assembly further comprises a retainer and a first needle roller disposed on one side of the piston housing and a second needle roller disposed on an opposite side of the piston housing.

5. The differential gear assembly of claim 4 wherein the piston further comprises at least one o-ring mounted thereon, the at least one o-ring configured to slidably traverse along the piston housing.

6. The differential gear assembly of claim 1 wherein the actuator assembly further comprises a hydraulic fitting extending from an outer diameter of the piston housing, the hydraulic fitting configured to communicate hydraulic fluid from a hydraulic fluid source to the actuator assembly.

7. The differential gear assembly of claim 1 wherein the pair of pinion gears are intermeshed with the first and second side gears to form a torque transfer arrangement configured for transferring torque between the pinion gears and the first and second side gears to rotate the first and second side gears about the axis of rotation, the torque transfer arrangement also being configured for allowing the first and second side gears to rotate at different rotational speeds with respect to one another about the axis of rotation.

8. The differential gear assembly of claim 1 wherein the clutch pack is concentric with the first side gear and the actuator assembly is concentric with the second side gear.

9. The differential gear assembly of claim 1 wherein the clutch pack and the actuator assembly are configured on opposite ends of the differential casing.

10. The differential gear assembly of claim 1 wherein the piston includes a piston body defined around a central piston axis, the piston body including a central piston wall, an outer diameter piston wall and an inner diameter piston wall and wherein the piston housing includes a central annular housing wall, an outer annular housing wall and an inner annular housing wall that collectively define an annular pocket that receives the piston.

11. The differential gear assembly of claim 1 wherein the lug is formed on the piston and the groove is formed on the piston housing.

12. The differential gear assembly of claim 11 wherein the lug is formed on the inner diameter piston wall and the groove is formed on the inner annular housing wall.

13. The differential gear assembly of claim 12 wherein the lug comprises a pair lugs configured on the inner diameter piston wall and the groove comprises a pair of grooves formed on the inner annular housing wall.

14. The differential gear assembly of claim 13 wherein the pair of lugs are arranged in a diametrically opposed relationship on the inner diameter piston wall and wherein the pair of grooves are arranged in a diametrically opposed relationship on the inner annular housing wall.

15. The differential gear assembly of claim 13 wherein the outer diameter piston wall defines a first annular groove and the inner diameter piston wall defines a second annular groove, wherein a first o-ring is received by the first annular groove and a second o-ring is received by the second annular groove, the first o-ring configured to slidably traverse along the outer annular housing wall, the second o-ring configured to slidably traverse along the inner annular housing wall.

16. A differential gear assembly comprising:
a differential casing defining first and second output shaft openings that are co-axially aligned along an axis of rotation of the differential casing;
a first and a second side gear rotatably mounted within the differential casing;
a piston having a piston body defined around a central piston axis, the piston body including a central piston wall, an outer diameter piston wall and an inner diameter piston wall, configured to exert an axial force on a clutch pack;
a piston housing having a central annular housing wall, an outer annular housing wall and an inner annular housing wall that collectively define an annular pocket that receives the piston;
a lug formed on one of the piston and piston housing; and
a groove defined by a groove wall on the other of the piston and the piston housing, wherein the lug is received by the groove and engagement of the lug and the groove wall inhibits rotation of the piston around the central piston axis.

17. The differential gear assembly of claim 16, further comprising the clutch pack, wherein the clutch pack includes a plurality of annular plates interleaved between a plurality of annular friction disks, the clutch pack arranged on an opposite side of the differential casing as the piston.

18. A differential gear assembly comprising:
a differential casing defining first and second output shaft openings that are co-axially aligned along an axis of rotation of the differential casing;
a first and a second side gear rotatably mounted within the differential casing;
a pair of pinion gears mounted between the first and second side gears, both of the pinion gears being rotatably mounted on a cross shaft that is fixed for rotation with the differential casing;
a clutch pack including a first transfer plate and plurality of annular plates interleaved between a plurality of annular friction disks, the clutch pack arranged on a first side of the cross shaft;
an actuator assembly comprising a second transfer plate and a piston received in a piston housing, the actuator assembly configured to actuate the clutch pack, the actuator assembly arranged on a second side of the cross shaft, opposite the first side;
a plurality of transfer rods coupled between the first and second transfer plates;
a lug formed on one of the piston and piston housing; and
a groove defined by a groove wall on the other of the piston and the piston housing, wherein the lug is received by the groove and engagement of the lug and the groove wall inhibits rotation of the piston around the central piston axis.

19. The differential gear assembly of claim 18 wherein the first and second side gears are co-axially aligned along the axis of rotation of the differential casing.

20. The differential gear assembly of claim 18 wherein:
the first side gear defines a first shaft opening configured to provide a first torque transmitting connection with a first output shaft received within the first output shaft opening; and
the second side gear defines a second output shaft opening configured to provide a second torque transmitting connection with a second output shaft received within the second output shaft opening.

21. The differential gear assembly of claim 18 wherein the actuator assembly further comprises a retainer and a first needle roller disposed on one side of the piston housing and a second needle roller disposed on an opposite side of the piston housing.

22. The differential gear assembly of claim 18 wherein the actuator assembly further comprises a hydraulic fitting extending from an outer diameter of the piston housing, the hydraulic fitting configured to communicate hydraulic fluid from a hydraulic fluid source to the actuator assembly.

23. The differential gear assembly of claim 18 wherein the piston includes a piston body defined around a central piston axis, the piston body including a central piston wall, an outer diameter piston wall and an inner diameter piston wall and wherein the piston housing include a central annular housing wall, an outer annular housing wall and an inner annular housing wall that collectively define an annular pocket that receives the piston.

* * * * *